United States Patent

Lautenschläger et al.

[11] Patent Number: 5,556,220
[45] Date of Patent: Sep. 17, 1996

[54] PLASTIC FASTENING PLUG, ESPECIALLY FOR FURNITURE HARDWARE

[75] Inventors: Horst Lautenschläger, Reinheim; Gerhard Lautenschläger, Brensbach-Wersau, both of Germany

[73] Assignee: MEPLA-Werke Lautenschläger GmbH & Co. KG, Germany

[21] Appl. No.: 450,128

[22] Filed: May 25, 1995

[30] Foreign Application Priority Data

Jun. 3, 1994 [DE] Germany .................. 44 19 422.6

[51] Int. Cl.⁶ .............. F16B 7/00; F16B 13/00; F16B 31/00; F16D 9/00
[52] U.S. Cl. ............. 403/298; 403/2; 403/12; 403/292; 411/1; 411/5; 411/180
[58] Field of Search ................ 403/2, 11, 12, 403/21, 292, 298, 247, 251, 342, 343, 405.1, 406.1; 411/1, 3, 5, 178, 180

[56] References Cited

U.S. PATENT DOCUMENTS

| | | | |
|---|---|---|---|
| 2,949,142 | 8/1960 | Sumerak | 411/180 |
| 3,169,258 | 2/1965 | Neuschotz | 411/178 X |
| 3,498,353 | 3/1970 | Barry | 411/180 |
| 4,174,238 | 11/1979 | Fowles et al. | 403/2 X |
| 4,755,079 | 7/1988 | Nishino | 403/2 |
| 5,391,031 | 2/1995 | Medal | 411/180 X |

FOREIGN PATENT DOCUMENTS

| | | |
|---|---|---|
| 0364970 | 11/1981 | Austria . |
| 0552606 | 7/1993 | European Pat. Off. . |
| 1916149 | 7/1963 | Germany . |
| 2628832 | 5/1979 | Germany . |
| 8202893 | 6/1982 | Germany . |
| 4119047 | 10/1992 | Germany . |
| 4240088 | 6/1994 | Germany . |
| 720218 | 11/1978 | U.S.S.R. ........... 411/5 |
| 2204654 | 11/1988 | United Kingdom . |

Primary Examiner—Blair Johnson
Assistant Examiner—Bruce A. Lev
Attorney, Agent, or Firm—Dvorak and Traub

[57] ABSTRACT

Fastening plug (10) made of plastic for fastening in a corresponding bore, especially for fastening furniture hardware on furniture, with an elongate stem portion (14) which can be releasably fastened on the associated hardware piece, from whose outer circumferential surface a number of annular projections (16) offset lengthwise on the stem having a triangular cross section tapering outwardly, each forming a knife-edge-like holding burr (18). The outside diameter of the holding burr is greater than the diameter of the corresponding bore, while the stem portion (14) has between the first annular projection (16) on the hardware end and the end facing the hardware a neck (20) whose diameter is smaller than the diameter of the corresponding bore. A spacer ring (22) is provided which extends past the neck (20) when the fastening plug (10) is in the intended mounting position on the hardware and supports the bottom of the hardware, and which is removable from the fastening plug (10) which remains in the corresponding bore after the hardware has been released from the fastening plug.

4 Claims, 3 Drawing Sheets

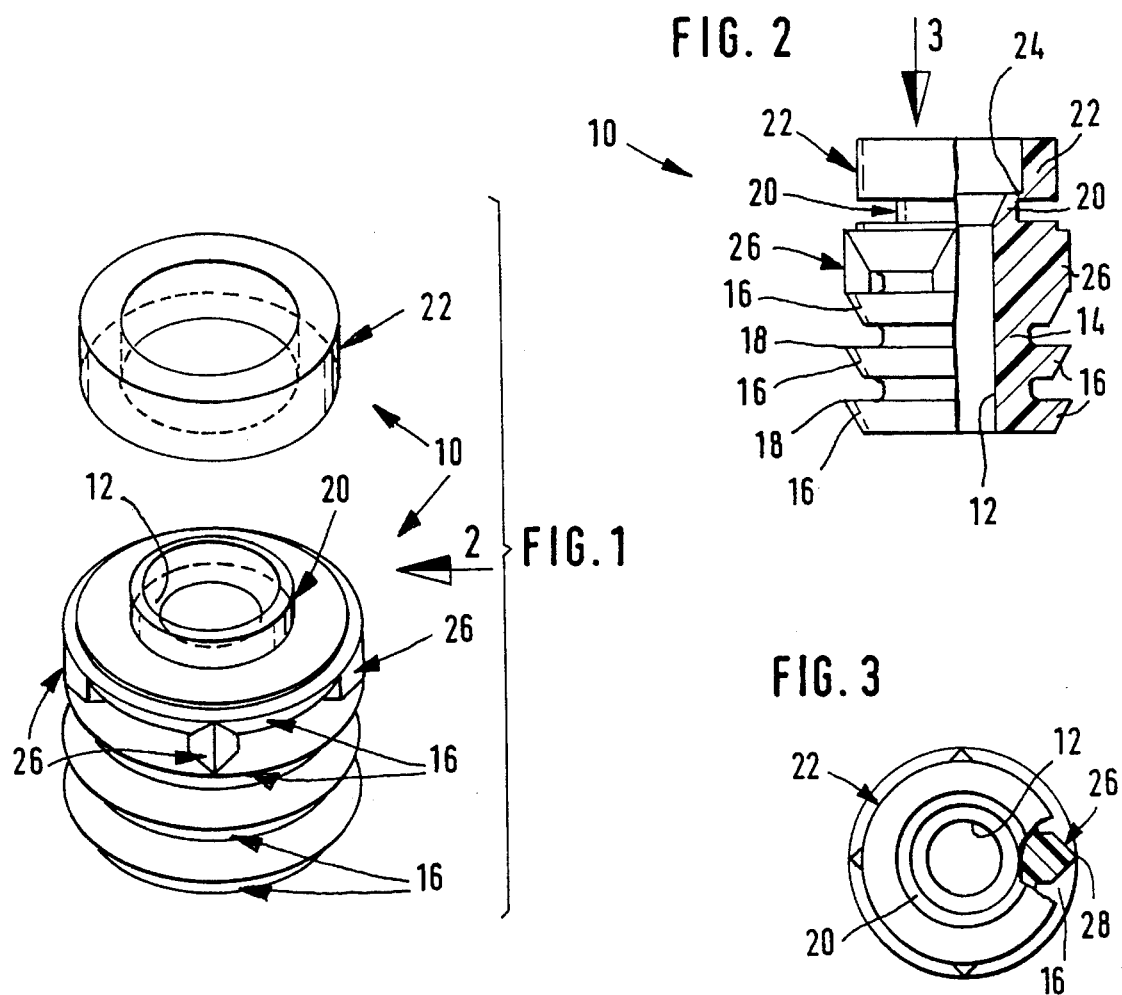

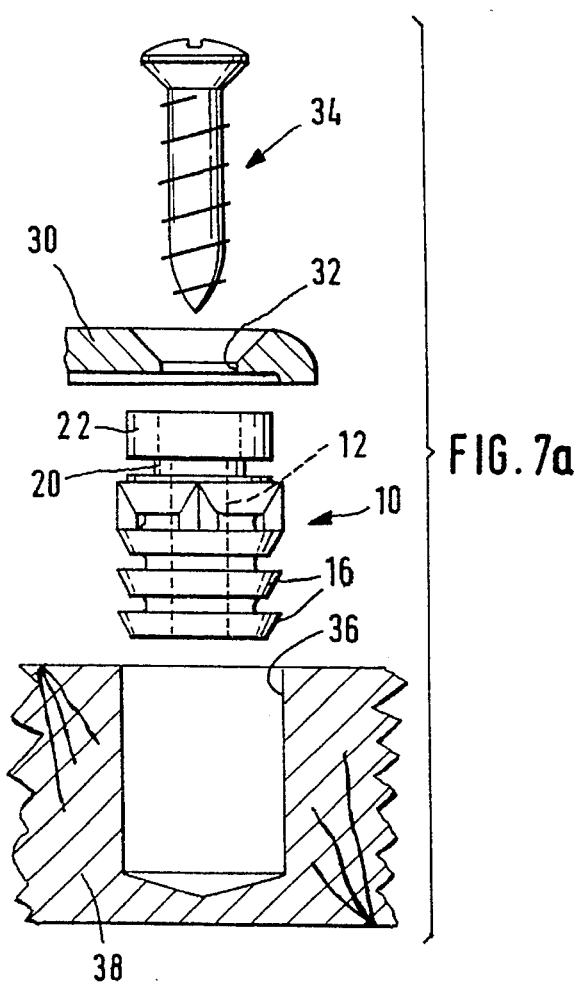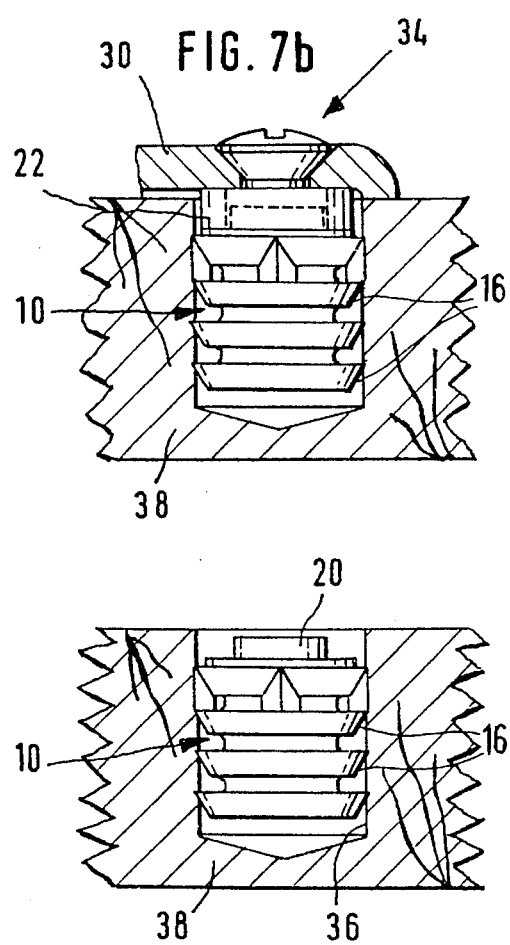

PLASTIC FASTENING PLUG, ESPECIALLY FOR FURNITURE HARDWARE

The invention relates to a fastening plug of plastic to be fixed in a corresponding bore, especially for fastening furniture hardware on furniture. Such a fastening plug has an elongate stem part that can be releasably fastened on the associated hardware part, and on its outer circumference it bears a plurality of circumferential annular projections offset from one another lengthwise of the stem part. These projections have a triangular cross section and terminate in a knife-edge to form a burr whose outside diameter is greater than the inside diameter of the corresponding bore, while the stem part has a neck between the first annular projection at the hardware end and the neck has a diameter smaller than the diameter of the corresponding bore.

Fastening plugs of this kind are configured as so-called "hammer-in plugs" which are made by the injection molding of plastic and are fastened with a screw to the bottom of a metal hardware piece to be mounted on the wall of a furniture piece. The hardware piece is fastened on the wall of the furniture by pressing or hammering the fastening plug or plugs into a bore of smaller diameter than that of the fastening plug. The hardware piece thus mounted on the furniture can be removed again from it by removing the screw that binds it to the fastening plug. The hardware can then be removed. The fastening plug itself remains in its bore in the furniture piece, so that the hardware can thus be reinstalled.

It has been found that, in many cases, after hardware has been installed, it becomes necessary to refinish the surface of the furniture by sanding it. Thus it can happen that the inside surface of a door has to be resanded with the hinge cups still installed. The removal of the hardware by unscrewing it from the fastening plugs still held in the corresponding bores offers no difficulty. When the door is sanded in the area of the fastening plugs, then of course the hardware end of the fastening plug is also sanded, i.e., plastic material is removed from the hardware end of the fastening plug, which on the one hand clogs the sanding disk and renders it ineffectual comparatively soon, but on the other hand it can result in ugly stains on the sanded side of the cabinet.

The invention is accordingly addressed to the problem of designing fastening plugs of the kind here in question such that, after the removal of a hardware piece mounted therewith on a cabinet, it will be possible to sand the cabinet in the area of the fastening plug left in its bore, without the danger of ablation of material of the fastening plug with its concomitant undesirable consequences.

Setting out from a fastening plug of the kind described above, this problem is solved by the invention by a spacer ring which supports the fastening plug at the bottom of the hardware and overreaches the neck of the fastening plug when the latter is in its proper position on the hardware piece, and which is removable from the fastening plug that is left in the corresponding bore when the hardware is removed from it. So, when it is necessary to resand the surface of the wall in the area in which a hardware piece is mounted, the hardware is unscrewed and the spacer ring removed, so that the remaining neck of the fastening plug is at a distance below the surface to be sanded. Sanding is then possible and the sanding tool cannot remove material from the fastening plug.

In a preferred embodiment of the invention, the spacer ring, during the manufacture of the fastening plug, is molded in one piece with the neck of the fastening plug, being connected to the latter by a break-away means, and its thickness is made slightly greater than the length of the neck; the neck and the spacer ring are formed so that the spacer ring can be driven lengthwise against the neck to snap the break-away means. The fastening plug is therefore made integral with the spacer ring, so that when the fastening plug is preassembled with the hardware there is no need to do complicated and error-prone assembly operations in which first the fastening plug and spacer ring are united and then screwed to the hardware piece. With the configuration according to the invention the break-away means is broken when the mounting screw is tightened, and the spacer ring slides over the neck to the desired position of the fastening plug on the hardware piece.

The hole in the spacer ring should be of a geometrical shape and size corresponding substantially to the external geometrical shape and size of the neck, the break-away means being constituted by a shape or by bridges of the plastic material of the fastening plug connecting the bottom of the spacer ring to the end of the neck adjacent the hardware piece. In the simplest case the hole in the spacer ring and the external surface of the neck is cylindrically defined, in which case the break-away means is formed by a circumferential thin film between the upper external margin of the neck and the bottom inner margin of the spacer ring.

Alternatively, the configuration can be made such that the neck has at least one projection, protruding claw-like in the lengthwise direction of the plug, with which there is associated an opening complementary to the shape of the claw-like projection, and that the break-away means is then formed by thin film-like connections between the confronting edges of the claw-like projection and the hole in the spacer ring. It has been found that, with a fastening plug thus constructed, the break-away means assumes the form of a plurality of short break-away bridges of thin plastic film which are easier to break than the circumferential film of the first embodiment. Moreover, there is the possibility, by appropriately sizing the claw-like projections and holes, to prevent any jamming of the projections in the holes, so that, if it should be necessary to resand the wall of the furniture, the spacer ring will be easier to remove from the bore after the hardware has been removed.

The invention will be further explained in the following description of an embodiment, in conjunction with the drawing, wherein:

FIG. 1 is a perspective view of an embodiment of a fastening plug according to the invention, wherein the spacer ring is sheared off at the break-away means from the neck portion and shown in a position raised from the rest of the fastening plug.

FIG. 2 is a half cut-away view of the integral fastening plug seen in the direction of the arrow 2 in FIG. 1.

FIG. 3 is a partially cut-away view of the fastening plug seen in the direction of arrow 3 in FIG. 2.

FIGS. 7a–7c represent different steps in the installation of a fastening plug on a piece of hardware and in a corresponding bore in a furniture piece.

Figure 4:
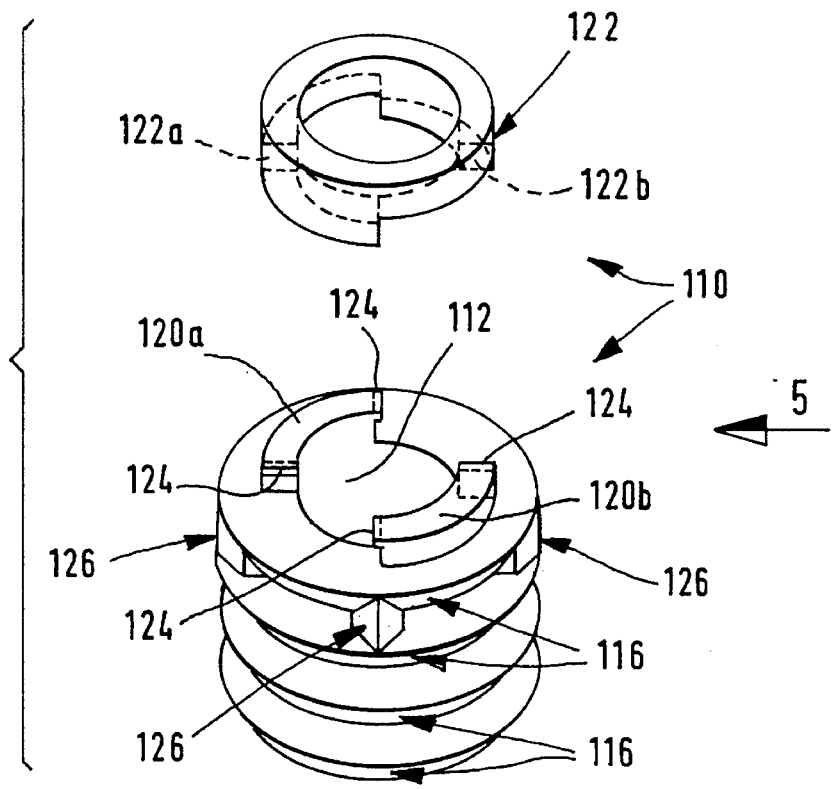
FIG. 4 shows a second embodiment of a fastening plug according to the invention, represented in the same manner as in FIG. 1.

The fastening plug represented in FIGS. 1 to 3 and identified as a whole by 10 is a plastic unit which in the form represented in FIG. 2 is ejected in one piece from the corresponding injection mold. The fastening plug 10 has an elongate body 14 containing a through-bore 12, and from its circumference a number of annular projections 16 offset from one another lengthwise on the fastening plug, which terminate at their outer margins in knife-edges 18.

Above the topmost annular projection 16 in FIGS. 1 and 2 there is provided a cylindrical neck 20. On the top margin of this neck 20 a spacer ring 22, also cylindrical, made from the same plastic material as the fastening plug, has an inside diameter slightly larger than the outside diameter of the neck 20, and an outside diameter slightly smaller than the maximum diameter of the fastening plug 10 measured across the edges 18 of the annular projections 16.

The thin circumferential web 24 joining the spacer ring 22 to the upper end of the neck will break away upon the application of a shearing force acting in the direction of the length of the fastening plug, i.e., it constitutes a break-away means. After the web 24 breaks, the spacer ring 22 can be pushed over the neck until it rests upon the upper end of the annular projection 16. Since the size of the spacer ring 22 in the direction of the length of the fastening plug is greater than that of the neck, the spacer ring will still be slightly thicker than the neck 20.

Between the topmost annular projection 16 and the next one down in FIGS. 1 and 2, four spur-like projections 26 are provided, which terminate in a vertical sharp edge 28 and constitute a means against rotation of the fastening plug in its bore.

After the web 24 has broken, as described above, the spacer ring 22 constitutes a separate component, which accordingly can be lifted away and removed from the rest of the fastening plug 10 in the manner represented in FIG. 1.

The manner in which the fastening plug 10 is applied to hardware, and how the hardware is fastened in a matching bore in a wall of the furniture piece, and how the fastening plug installed in the bore is situated after the hardware and the spacer ring are removed will be explained in conjunction with FIGS. 7a and 7c.

Figure 5:
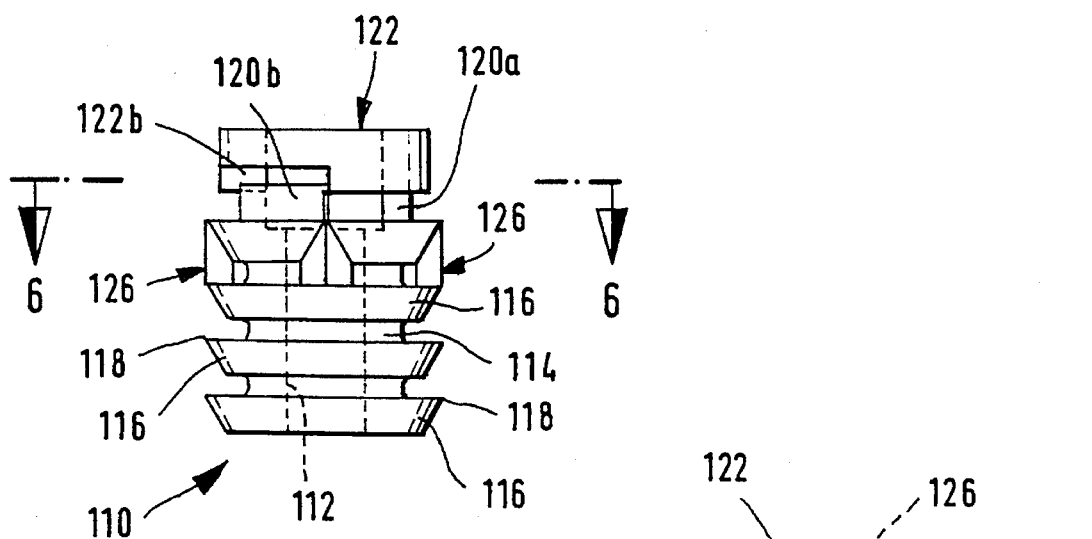
FIG. 5 is a side view of the fastening plug seen in the direction of arrow 5 in FIG. 4, in which the spacer ring is still integral with the fastening plug through the scoring.
Figure 6:
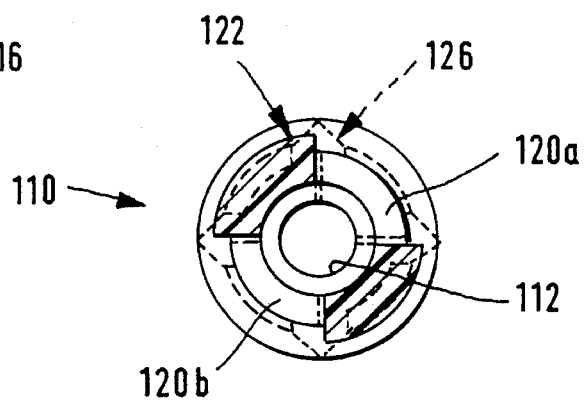
FIG. 6 is a cut-away view seen in the direction of arrows 6—6 in FIG. 5.

First, however, an additional, preferred embodiment of a fastening plug 110 different from fastening plug 10 is to be described, which is represented in FIGS. 4 to 6. The modifications made have to do essentially with different configurations of the neck and spacer ring, so that it will suffice to describe only the changes made in these areas, while for the rest of the configuration of the fastening plug 110 the description of fastening plug 10 may be consulated, inasmuch as functionally equal parts of both fastening plugs are given the same reference numbers in the drawings, but preceded by the numeral 1 in the case of fastening plug 110.

The neck 20 of fastening plug 10 is, in the case of fastening plug 110, divided virtually into two diametrically opposite, spur-like projections 120a and 120b and extending each over 90° in the circumferential direction, and complementary recesses 122a and 122b are formed in the spacer ring 122.

The spacer ring 122 is attached to the spur-like projections 122a and 122b along the four break-away webs 124 which are also indicated in FIG. 4 at the upper radial edges of the spur-like projections 120a, and which are broken away from the opposite radial edges of the recesses 122a and 122b. It can be seen that the four webs 124 representing the break-away means offer less resistance to shearing or breaking by shearing forces acting in the direction of the length of the fastening plug than is offered by the circumferential web 24 in fastening plug 10. Furthermore, the spacer ring 122 of fastening plug 110 can more easily be lifted out from the bore in the furniture piece after the hardware has been unscrewed.

FIGS. 7a to 7c, in conjunction with a fastening plug of the configuration described in FIGS. 1 to 3, indicate how the fastening plug is attached to hardware, how the hardware assembled with the fastening plug is fastened in a bore in a wall of the furniture, and lastly the part of the installed fastening plug that remains in the bore after removal of the hardware and of the spacer ring.

In FIG. 7a only an outer flange 30 of the hardware part is shown, which is, let us say, the mounting flange of a hinge cup designed to be hammered in place. In the mounting flange 30 there is provided a hole 32 into which a screw 34 can be countersunk. When the screw is driven in, at first it is driven into the through bore 12 until the head of the screw comes in contact with the countersink of hole 32 of the hardware flange 30, and the spacer ring 22 has been drawn against the bottom of flange 30. By further tightening of the screw 34 the circumferential web 24 forming the break-away means is broken. By additional tightening of the screw, the neck 20 is then drawn into the spacer ring until the spacer ring 22 rests upon the topmost annular projection 16 of the fastening plug. In this state the fastening plug is preinstalled in the proper manner on the flange 30 and the hardware piece can then be pressed or hammered into the door 38. FIG. 7b shows the fastening plug installed on the inner side of the door 38. Whenever the hardware is released from its connection with the fastening plug by removing the screw 34 from the fastening plug; the hardware can be lifted away and the spacer ring 22 can be taken out of the bore 36. Then the fastening plug without the spacer ring remains in the bore 36 in the position represented in FIG. 7c. It can be seen that the neck 20 is at a distance below the inner side of the door, so that this inner side can be resanded without the sanding disk coming into contact with the neck 20. Then there need be no fear of clogging the face of the sanding disk, much less of any discoloration or contamination of the sanded inside of the door by plastic particles cut from the neck 20.

We claim:

1. A plastic fastening plug, installable in a corresponding bore, for fastening furniture hardware on furniture pieces, comprising:

an elongated stem portion, having a hardware fastening end and an outer circumferential surface, for releasably fastening an associated hardware part;

a plurality of annular circumferential projections extending from the outer circumferential surface and offset along the length of the fastening plug, each annular projection having a triangular cross-section forming a gripping ridge;

a neck portion between a first annular projection and the hardware fastening end;

a spacer ring (22, 122) disposed at the hardware fastening end and extending beyond the neck portion (20, 120a, 120b) for contacting the fastening plug (10, 110) with the bottom of the hardware part (30), the spacer ring having a thickness measured lengthwise of the fastening plug which is slightly greater than the thickness of the neck; and break-away means (24, 124) connecting the spacer ring (22, 122) to the neck portion, wherein the spacer ring is integrally formed on the neck portion by the break-away means during the manufacture of the fastening plug (10, 110) such that the spacer ring is removably connected to the fastening plug; and wherein the neck and the spacer ring are shaped such that the spacer ring can be thrust lengthwise of the fastening plug against the neck (20, 120a, 120b).

2. The fastening plug according to claim 1, wherein the spacer ring (22) has a through-opening whose geometric shape and dimensions conform to the external geometric shape and dimensions of the neck (20), and wherein the break-away means (24) is formed by a film or by portions of the plastic material of the fastening plug (10) which joins the bottom of the spacer ring (22) integrally to the end of the neck (20).

3. The fastening plug according to claim 2, wherein the through-opening of the spacer ring and the neck (20) are cylindrically defined.

4. The fastening plug according to claim 3, wherein the neck has at least one projection (120a; 120b) extending lengthwise of the fastening plug, said projection or projections being associated with a corresponding recess or recesses (122a; 122b), in an end face area of the spacer ring, and having a shape complementary to the shape of the projection or projections, and wherein the break-away means is formed by thin film connections (124) between the confronting edges of the projection or projections and those of the recess or recesses (122a; 122b) of the spacer ring (122).

* * * * *